United States Patent

Neff

[15] 3,643,893

[45] Feb. 22, 1972

[54] WEB-THREADING APPARATUS

[72] Inventor: Joseph J. Neff, Pasadena, Calif.

[73] Assignee: Bell & Howell Company, Chicago, Ill.

[22] Filed: Aug. 4, 1969

[21] Appl. No.: 847,032

[52] U.S. Cl. ..................................242/195, 226/91, 242/76, 352/157

[51] Int. Cl. ....................................G03b 1/04, G11b 15/32

[58] Field of Search ................................242/195, 205–210, 242/76; 352/157, 158; 226/91, 92

[56] References Cited

UNITED STATES PATENTS

| | | | |
|---|---|---|---|
| 3,363,853 | 1/1968 | Irvin | 242/195 X |
| 3,254,858 | 6/1966 | Camras et al. | 242/197 |

*Primary Examiner*—Leonard D. Christian

*Attorney*—David Weiss

[57] ABSTRACT

Automatic web threading apparatus providing an unobstructed and continuous temporary threading path between web supply and takeup stations. A threading track having integral stripper means is normally positioned completely out of the web transport path, and during threading operation the track is caused to move to a position for receiving the web, or a "relatively stiff" leader attached thereto, when supplied by the supply station and for guiding the supplied web or leader to the takeup station.

9 Claims, 5 Drawing Figures

Joseph J. Neff,
INVENTOR.
BY.
David Weiss
ATTORNEY.

Joseph J. Neff,
INVENTOR.
BY.
David Weiss
ATTORNEY.

Joseph J. Neff,
INVENTOR.
BY.
David Weiss
ATTORNEY.

WEB-THREADING APPARATUS

BACKGROUND OF THE INVENTION

1. Field of the Invention

This invention relates to web-threading apparatus, and more particularly to apparatus for receiving a driven "relatively stiff" web and for automatically positioning the web along a web transport path.

Although the present invention is described herein with respect to magnetic tape apparatus, the invention can be applied to any web transport apparatus provided with a flexible web having sufficient stiffness to permit automatic threading thereof. Accordingly, other applications are included within the scope of the present invention, and more particularly, the automatic threading of film in motion picture projectors and cameras.

2. Description of the Prior Art

Magnetic tape recorder/playback apparatus having an automatic tape threading capability are well known to the prior art. In many systems, a "relatively stiff" leader is attached to the free end of conventional, limp magnetic tape, and the leader is guidably driven to a position for being received by the takeup reel of the transport apparatus. As used herein, a "relatively stiff" leader (or web) described a leader (or web) having sufficient stiffness to resist applied longitudinal and transverse forces usually encountered in automatic threading systems, yet having sufficient flexibility to permit threading thereof along a predetermined guide path and to permit winding of the leader by the takeup reel.

In one type of tape threading apparatus, the relatively stiff leader is directed along a portion of the tape transport path as the recorder's tape supply reel is driven in a tape unwinding direction, the leader being guided along the path by an included guide channel which extends from the supply reel to a drive capstan. Upon engaging the capstan, the leader is thereupon driven by the capstan through the remaining portion of the tape transport path where it is received by the takeup reel. During this time, the capstan-driven leader is guided by additional guiding devices, such as channels and studs, positioned in progressive guiding relation with various components of the tape transport apparatus, such as rollers and an additional capstan.

In this type of threading system, the end of the driven leader is often obstructed from its intended progress during the threading procedure. Obstructions are provided at points of discontinuity in the leader guide apparatus and by the presence of the various transport and recorder components located along the transport path. The end of the driven leader has a tendency to "hang up" when engaging these obstructions, causing the leader to assume undesired unwinding configurations which significantly interfere with the threading procedure.

SUMMARY OF THE INVENTION

By the automatic threading apparatus of the present invention, this tendency associated with the prior art systems is eliminated by providing an unobstructed and continuous temporary threading path between the tape-supply reel and the takeup reel. A threading track having integral leader pickoff or stripper means is normally positioned completely out of the tape transport path, and during a threading operation the track is caused to move to a position for receiving the leader when supplied by the supply reel and for guiding the supplied leader to the takeup reel.

The leader threading path provided by the track does not coincide with the tape transport path but is adjacent to the transport path. Upon removing the track from the threading path after capture of the leader by the takeup reel, longitudinal tension induced in the tape (by conventionally practiced differential rotation of the takeup and supply reels) causes the tape to assume the desired tape transport path.

Transmission means is provided for moving the track between its two alternate positions in response to applied actuating forces, as well as for supporting the track in each position.

BRIEF DESCRIPTION OF THE DRAWINGS

The novel features which are believed to be characteristic of the invention together with further advantages thereof, will be better understood from the following description considered in connection with the accompanying drawings in which a preferred embodiment of the present invention is illustrated by way of example. It is expressly understood, however, that the drawings are for the purpose of illustration and description only and are not intended as a definition of the limits of the invention.

DESCRIPTION OF THE PREFERRED EMBODIMENT

Figure 1:
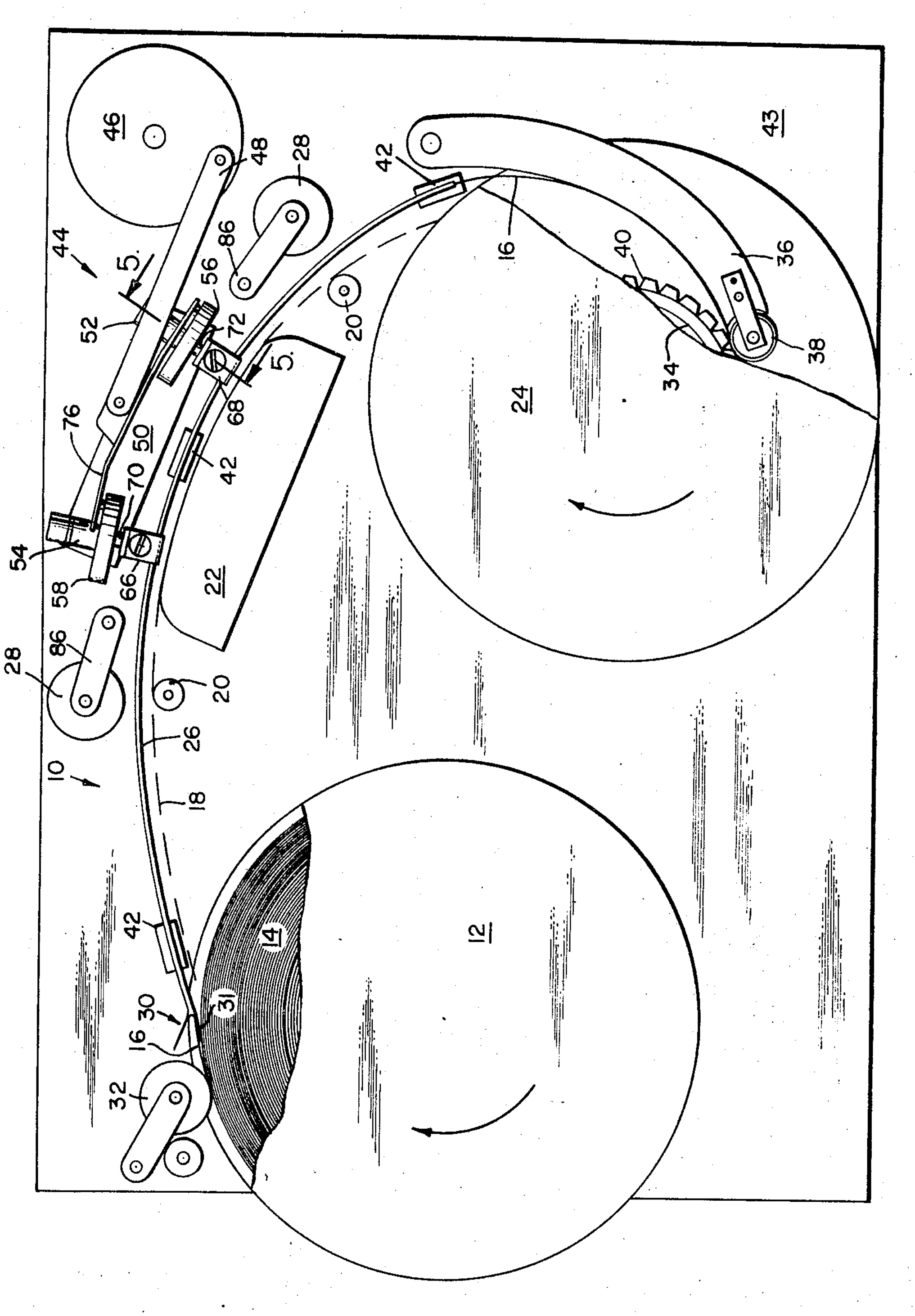
FIG. 1 is a plan view of a preferred embodiment of an automatic threading apparatus in accordance with the present invention, shown in its web threading position and in operative combination with magnetic tape recorder/playback apparatus.

Turning first to FIG. 1, the preferred embodiment of threading apparatus 10 is shown in one of two alternative positions with respect to conventional tape recorder/playback apparatus. A supply reel 12 is ordinarily provided with magnetic tape 14 wound thereon, the tape having attached to an end thereof a relatively stiff leader 16 conventionally utilized in the tape recorder art for facilitating threading of the tape along a tape transport path 18. During transport, the tape extends between the supply reel 12, in tape driving engagement with capstan means (such as a pair of capstans 20), in magnetic contact with a transducer assembly 22 (including magnetic head units), and the path 18 terminates at a takeup reel 24 for permitting the transported tape 14 to be wound therein.

The threading apparatus 10 includes an arcuate track 26 for guiding the leader 16 along a threading path which generally follows the tape transport path 18 but does not coincide therewith. As viewed in FIG. 1, the leader threading path is displaced from the tape transport path 18 in such manner that the track 26 does not contact the capstans 20 and the transducer assembly 22 during the threading procedure. Pinch rollers 28, normally in pressure engagement with the capstans 20 (with the transported tape 14 therebetween, see FIG. 2), are movable away from the capstans 20 for permitting the track 26 to be positioned along the leader threading path during the threading procedure.

The supply end of the track 26 includes integral stripper or leader pickoff means, such as a flare 30, for picking off or stripping the free end of the leader 16 from the leader's wound condition, for being received by the track 26 during clockwise rotation of the fully wound supply reel 12. The tape engaging portion 31 of the flared stripper 30 is preferably slightly resilient and engages the wound leader 16 approximately tangentially. If desired, leader restraining means such as an idler roller 32 can be provided for restraining the leader 16 from assuming an undesired unwinding configuration during pick off.

The tape recorder can further include means cooperating with the takeup reel 24, for causing the takeup reel 24 to receive the leader 16 when supplied thereto, and to direct and secure the leader toward the takeup reel's hub 34 for capturing the leader about the hub during clockwise rotation of the takeup reel 24. For example, a pivotal guide arm 36 including a wheel 38 at its free end and biased toward the hub 34, can be provided for directing the approaching leader 16 toward the hub 34 and into grasping engagement with releasable securing means such as a plurality of resilient "fingers" 40 situated about the hub 34.

Figures 2, 5:
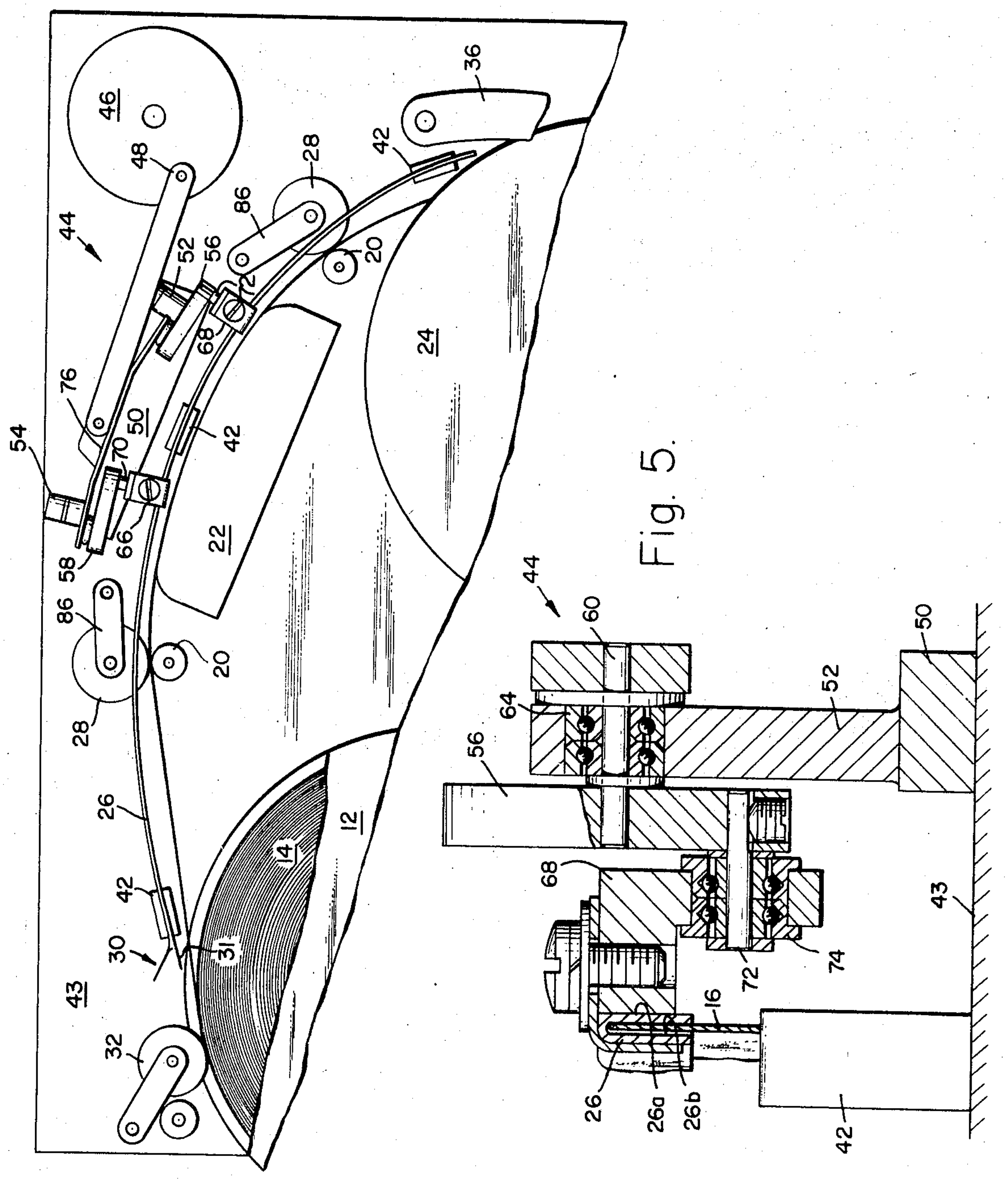
FIG. 2 is a fragmentary portion of the apparatus of FIG. 1, showing the threading apparatus in its normal position.
FIG. 5 is a cross-sectional view of the preferred embodiment of the web threading apparatus as shown in FIG. 1, taken along the line 5—5 in the direction of the appended arrows.
Figure 3:
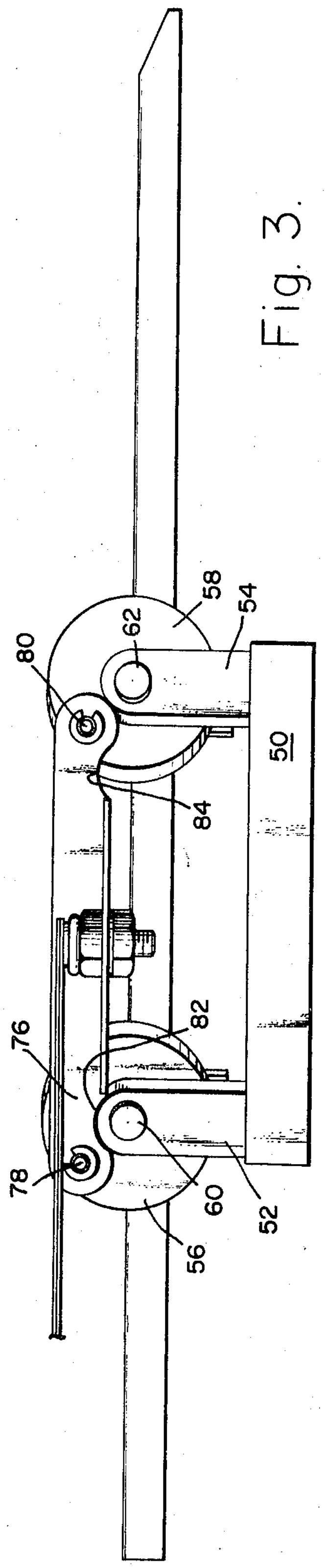
FIG. 3 is a rear-elevation view of the preferred embodiment of the web-threading apparatus as shown in FIG. 1.
Figure 4:
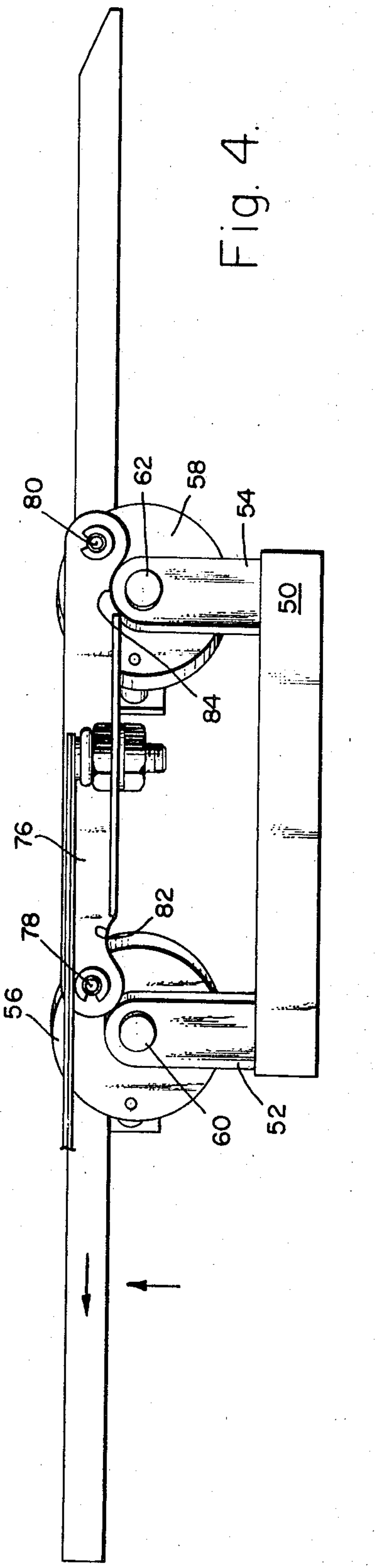
FIG. 4 is a rear-elevation view of the preferred embodiment of the web-threading apparatus as shown in FIG. 2.

The threading apparatus 10 is best described upon concurrent consideration of FIGS. 1 through 5. The two alternative positions of the movable components of the threading apparatus 10 are shown in FIGS. 1 through 4, the threading position or configuration being shown in FIGS. 1 and 3, and a normal configuration (for example, during tape transport) is shown in FIGS. 2 and 4.

It should be noted that the relatively stiff leader 16 is preferably slightly greater in width than the magnetic tape to which it is attached, and the leader 16 is preferably at least as long as the length of the threading path between supply and takeup reels 12, 24. During the threading procedure, the upper edge and at least one side of the leader 16 are guidably supported between spaced vertical wall portions 26a, 26b of the inverted U-shaped track 26, the wall portions communicating along upper edges thereof, as best shown in FIG. 5. The wall portions 26a, 26b are preferably at least one-half the width of the leader 16, and the lower edge of the leader 16 can be supported by a plurality of support blocks 42 mounted on the recorder's deck 43.

The track 26 is supported in its two alternative positions by a transmission means 44 mounted to the deck 43 and drivable by actuable drive means such as a rotary solenoid 46 through a drive arm 48. The transmission means 44 is mounted to the deck by an included mounting base 50 having a pair of upwardly extending mounting arms 52, 54. A pair of bell cranks 56, 58 are rotatably mounted to respective ones of the mounting arms 52, 54, by corresponding center pins 60, 62 rigidly attached to the bell cranks 56, 58 and rotatably attached to the mounting arms 52, 54 by means of bearings 64 (see, in particular, FIG. 5).

The track 26 is rigidly mounted to a pair of block members 66, 68 which in turn are coupled to the respective bell cranks 56, 58 by respective radial pins 70, 72 rigidly attached along a radius of the respective bell cranks, and rotatably attached to the block members 66, 68 by means of a bearing 74.

The first center pin 60 and the first radial pin 70 associated with the first bell crank 56 are aligned parallel to one another, while the second center pin 62 and the second radial pin associated with the second bell crank 58 are similarly aligned parallel with one another. The axes of the two center pins 60, 62, however, are not parallel, but are arranged so that concurrent and equal rotation of the bell cranks 56, 58 cause an arcuate horizontal movement of the track 26 in addition to the vertical movement of the track 26 determined by the perpendicular distance between the axes of a radial pin 70, 72 and its corresponding center pin 60, 62.

The bell cranks 56, 58 are caused to be concurrently and equally rotated upon actuation of the solenoid 46, by means of a linking member 76 linking the bell cranks 56, 58 with one another, the drive arm 48 being pivotally connected to the linking member 76. The linking member 76 is coupled to the bell cranks 56, 58 by means of linking pins 78, 80 rotatably coupled to the linking member 76 and rigidly coupled to the bell cranks 56, 58. The linking pins 78, 80 are arranged respectively parallel to its associated center pin 60, 62.

When the linking member 76 is moved toward the right as shown in FIG. 4 (by the drive arm 48), the linking member 76 additionally moves in a generally circular path (vertically) in accordance with the restraints imposed thereupon by the linking pins 78, 80 and the bell cranks 56, 58. A pair of detents 82, 84 are provided in the linking member 76, which respectively enter into contacting engagement with a one of the cylindrical ends of the mounting arms 52, 54 for defining the limits of rotation of the bell cranks 56, 58.

As stated earlier, the track 26 is normally in a first position (FIGS. 2 and 4) removed from the tape transport path 18. When it is desired to thread the leader 16 along the threading path for being received by the takeup reel 24, the pinch rollers 28 are removed from the tape transport path (for example, by actuation of associated pivot arms 86). Energization of the rotary solenoid 46 causes the drive arm 48 to move from its normal position to a threading position (FIGS. 1 and 3). Such movement of the drive arm 48 causes the linking member 76 to concurrently rotate the bell cranks 56, 58 until the detents 82 engages the mounting arm 52. The consequent movement of the block members 66, 68 into the positions shown in solid line in FIG. 1, causes corresponding movement of the track 26 into the leader threading position. The flared leader pickoff 30 is accordingly placed into stripping engagement with the wound leader 16, so that when the supply reel 12 is rotated in a tape unwinding direction the pickoff flare 30 receives the free end of the leader 16. Continued unwinding of the leader 16 causes the leader to be guided by the track 26 (the leader's bottom edge being supported at suitable locations by the support blocks 42) along the threading path for being retainably received by the rotating takeup reel 24.

After the end of the leader 16 has been captured by the rotating takeup reel 24, this condition is sensed by suitable sensor-switch means for deenergizing the rotary solenoid 46. For example, tension sensor means (not shown) for sensing tape tension conventionally applied by means of a difference in rotation between the takeup reel 24 and the supply reel 12, can be utilized for sensing capture of the leader 16 by the takeup reel 24. A sensor controlled switch means (not shown) can be actuated for deenergizing the solenoid 46, causing the drive arm 48 to drive the track 26 into its normal position completely out of the tape transport path 18 (i.e., reversing the movements as described above with respect to energization of the solenoid 46). As shown in FIG. 2, such movement of the track means 26 causes the flared pick-off 30 to be laterally disengaged from the wound leader 16 or tape 14. As further shown in FIG. 4, the track 26 is simultaneously raised from the leader 16 and is withdrawn from guiding engagement therewith.

The removal of the track 26 from the threading path and from the vicinity of the tape transport path 18, together with the tension produced in the leader 16 when captured by the takeup reel 24 causes the remaining portion of the leader 16 (and consequently the transported tape 14) to assume the tape transport path 18. At this point, the pinch rollers 28 can be replaced into pressure engagement with the capstans 20 (FIG. 2).

This, there has been described a preferred embodiment of automatic web threading apparatus for web transport system, such as in a motion picture projector or a tape recorder, the threading apparatus characterized by a threading track normally in a first position out of the web transport path, and alternatively in a second position providing an unobstructed and continuous threading path between supply and takeup stations. Other embodiments of the present invention and modifications of the embodiment herein presented may be developed without departing from the essential characteristics thereof.

Accordingly, the invention should be limited only by the scope of the claims listed below.

What is claimed is:

1. In web transport apparatus, the combination comprising:
supply means providable with a wound relatively stiff web;
takeup means for retainably receiving the web;
threading means normally in a first position removed from said supply means and said takeup means, and alternatively in a second position interposed between said supply means and said takeup means for providing a threading path for the web; and
means for moving said threading means in a lateral and simultaneously in a vertical direction to position said threading means alternatively in said first and second positions.

2. In web transport apparatus, the combination comprising:
supply means providable with a wound relatively stiff web;
takeup means for retainably receiving the web;
threading means including stripper means for receiving the web in response to unwinding of the web by said supply means and track means integral with said stripper means for guiding the web to said takeup means along a threading path, said track means including a channel defining the threading path and having spaced wall portions communicating along an edge of each of said wall portions; and means for removing said threading means from said threading path after the web is retainably received by said takeup means.

3. In magnetic tape apparatus, the combination comprising:

supply means providable with wound magnetic tape having a relatively stiff leader attached to one end thereof and wound thereabout;

takeup means for retainably receiving the leader;

track means normally in a first position removed from said supply means and said takeup means, and alternatively in a second position interposed between said supply means and said takeup means for providing a threading path for the leader, said track means including a channel defining the threading path and having spaced wall portions communicating along an edge of each of said wall portions; and stripper means integral with said track means for receiving the leader when said track means is in said second position.

4. In magnetic tape apparatus, the combination comprising:

supply means providable with wound magnetic tape having a relatively stiff leader attached to one end thereof and wound thereabout;

takeup means for retainably receiving the leader;

threading means including stripper means for receiving the leader in response to unwinding of the leader by said supply means and track means integral with said stripper means for guiding the leader to said takeup means along a threading path, said track means including a channel defining the threading path and having spaced wall portions communicating along an edge of each of said wall portions; and means for removing said threading means from said threading path after the leader is retainably received by said takeup means.

5. In magnetic tape transducer apparatus, the combination comprising:

supply means providable with magnetic tape having a relatively stiff leader attached to an end thereof;

takeup means for retainably receiving the leader when supplied thereto by said supply means;

a magnetic transducer head;

transport means for transporting the tape along a tape transport path such that the tape is in magnetic contact with said transducer head; and threading means normally in a first position removed from said tape transport path and alternatively in a second position adjacent to said tape transport path, including stripper means for receiving the leader when supplied by said supply means and track means integral with said stripper means for guiding the supplied leader to said takeup means, said track means including a channel having spaced wall portions communicating along an edge of each of said wall portions.

6. For combination with magnetic tape apparatus including tape-supply means provided with magnetic tape having a relatively stiff leader attached to an end thereof, tape takeup means for retainably receiving the leader when supplied thereto, and transport means for transporting the tape along a predetermined transport path between the supply and takeup means; apparatus for threading the leader along a threading path such that the leader is superimposed upon the transport path after being received by the takeup means, comprising:

leader guide means positionable along the threading path and removable therefrom, including track means for guiding the leader when received from the supply means to the takeup means and stripper means integral with said track means for receiving said leader when said guide means is positioned along the threading path, said track means including a channel defining the threading path and having spaced vertical wall portions communicating along an upper edge of each of said wall portions;

transmission means supporting said guide means, for positioning said guide means alternatively along the threading path and removed therefrom, in response to applied actuating forces; and drive means for applying said actuating forces to said transmission means.

7. The apparatus according to claim 6, above, further including means for supporting the leader when guided along the threading path.

8. The apparatus according to claim 6, above, wherein said stripper means includes a flared end portion of each of said wall portions.

9. For combination with magnetic tape apparatus including tape-supply means provided with magnetic tape having a relatively stiff leader attached to an end thereof, tape take-up means for retainably receiving the leader when supplied thereto, and transport means for transporting the tape along a predetermined transport path between the supply and takeup means; apparatus for threading the leader along a threading path such that the leader is superimposed upon the transport path after being received by the takeup means, comprising:

leader guide means positionable along the threading path and removably therefrom, for receiving and guiding the leader from the supply means to the takeup means when said guide means is positioned along the threading path;

transmission means supporting said guide means, for positioning said guide means alternatively along the threading path and removed therefrom, in response to applied actuating forces, wherein said leader guide means moves in a lateral direction and simultaneously in a vertical direction during positioning by said transmission means; and drive means for applying said actuating forces to said transmission means.

* * * * *